United States Patent [19]

Longo

[11] Patent Number: 5,287,647

[45] Date of Patent: Feb. 22, 1994

[54] CRAB TRAP

[76] Inventor: James J. Longo, 1101 Lakewood Dr., Carrcroft, Wilmington, Del. 19803

[21] Appl. No.: 10,672

[22] Filed: Jan. 28, 1993

[51] Int. Cl.⁵ ............................................ A01K 69/10
[52] U.S. Cl. ...................................... 43/105; 43/100; 43/102
[58] Field of Search .................. 43/100, 102, 103, 105

[56] References Cited

U.S. PATENT DOCUMENTS

| | | | |
|---|---|---|---|
| 1,531,300 | 3/1925 | Merle | 43/105 |
| 1,968,758 | 7/1934 | Gatch | 43/105 |
| 2,584,643 | 2/1952 | Vander Clute | 43/105 |
| 2,821,047 | 1/1958 | Ruiz | 43/102 |
| 3,867,782 | 2/1975 | Ortiz | 43/105 |
| 4,044,493 | 8/1977 | Fox | 43/105 |
| 4,530,182 | 7/1985 | Ponzo | 43/102 |
| 4,554,760 | 11/1985 | Ponzo | 43/105 |
| 4,587,758 | 5/1986 | Ponzo | 43/102 |
| 4,654,997 | 4/1987 | Ponzo | 43/102 |
| 4,739,579 | 4/1988 | Jakimas | 43/102 |

*Primary Examiner*—Kurt C. Rowan
*Attorney, Agent, or Firm*—E. Alan Uebler

[57] ABSTRACT

A crab trap is provided having an open configuration prior to trapping a crab and into which a crab can crawl to retrieve bait placed therein, the trap also having a closed configuration for trapping a crab therein. The trap has a generally rectangular frame assembly comprising a base frame having two hollow bottom side connecting tubes and two hollow bottom end connecting tubes connected at their corners by corner elbow connectors. A plurality of hollow vertical corner posts is inserted in the corner elbow connectors and is three dimensionally perpendicular to the rectangular frame. The vertical corner posts each have a longitudinal opening extending from the lower end of the vertical corner post to the approximate center point of the vertical corner post along the length of the vertical corner post. The bottom side connecting tubes, bottom end connecting tubes and vertical corner posts all contain a plurality of openings to permit water to flow through. A mesh covering covers the frame on the top, sides and ends and is attached to the frame at strategic locations by suitable retainers. The bottom mesh rests on the base frame. A plurality of draw cords, one end of each draw cord being tied to one side or corner of the bottom mesh is threaded through the openings in the vertical corner posts and exits at the upper ends of the vertical corner posts, the plurality of draw cords being joined together at a common point above the frame into a single draw cord which extends to the water surface.

3 Claims, 3 Drawing Sheets

CRAB TRAP

BACKGROUND OF THE INVENTION

This invention relates to a crab trap which is both easy to set and pull out. Further, the trap is self-righting because its frame members are constructed of PVC or CPVC piping such as plumber's piping which is water balanced. The trap is stable in the water due to the tubular members being water filled. In a preferred embodiment, the trap is lightweight, weighing less than 1.68 pounds (767 grams). The trap may be held together with common household items such as cable ties, bag ties, cotter pins, bolts, wire, string or hitch pins. The mesh of the trap is preferably galvanized steel. Though the wire mesh may eventually rust, the frame will always remain and can be re-used and the mesh can be easily replaced.

The trap ca be baited at both the top and the bottom and the crab can not see anything move. The bottom of the trap meets the upper part of the trap and no opening exists for the crabs to escape, as can occur with a previous type of four sided trap. The trap is self draining and does not need wrapping to hold doors closed. When storing, the trap of this invention according to one embodiment has compact doors which will not tangle and break.

Numerous apparatuses have been provided in the prior art for the trapping of crabs. For example, Fox U.S. Pat. No. 4,044,493 and Stuart U.S. Pat. No. 4,765,088 provide for traps with folding doors which close to trap the crab. The devices in Petrella U.S. Pat. No. 4,134,226, Ponzo U. U.S. Pat. No. 4,530,182 and Ponzo U.S. Pat. No. 4,587,758 all require portions of the trap to be buoyant for them to operate. Springs are required by the devices in Jakimas U.S. Pat. No. 4,739,579 and Downing U.S. Pat. No. 4,706,409.

SUMMARY OF THE INVENTION

The invention is a crab trap having an open configuration prior to trapping a crab and into which a crab can crawl to retrieve bait. The trap also has a closed configuration for trapping a crab. The trap has a generally rectangular frame having a base frame with two hollow bottom side connecting tubes and two hollow bottom end connecting tubes. The bottom side connecting tubes are parallel to one another and the bottom end connecting tubes are parallel to one another. The bottom side connecting tubes and bottom end connecting tubes are perpendicular to each other and the bottom side connecting tubes and the bottom end connecting tubes are joined by a plurality of 90° corner elbow connectors. A plurality of hollow vertical corner posts are inserted in the corner elbow connectors and are three dimensionally perpendicular to the bottom side connecting tubes and bottom end connecting tubes. The vertical corner posts contain a longitudinal slot-like opening extending from the lower end of the vertical corner post along the length of the vertical corner post to approximately the center point of the vertical corner post. The bottom side connecting tubes, bottom end connecting tubes and vertical corner posts all contain a plurality of openings to permit water entry and exit there through in order to stabilize the trap in rough water.

The frame is covered by mesh covering. The mesh covering is comprised of a top mesh, two mesh ends, two mesh sides, and a bottom mesh. The top mesh covers the area formed by the plane extending between the top ends of the vertical corner posts. The mesh sides and mesh ends cover the planes formed from the top ends of the vertical corner posts to the approximate mid-point of the respective hollow vertical corner posts. The top mesh, mesh ends, and mesh sides are all connected to the frame by a plurality of retainers at strategic locations. The bottom mesh rests on the base frame, but is otherwise not connected thereto.

A plurality of draw cords, with one end of each draw cord tied to one side or corner of the bottom mesh, is threaded through the openings in the vertical corner posts, at least one per post, and exits at the upper ends of the vertical corner posts. The plurality of draw cords is joined together at a common point above the frame and is attached to a single common draw cord and that single draw cord extends to the water surface. When the single common draw cord is pulled, the plurality of individual draw cords slides within the vertical corner posts and the bottom mesh rises to meet the lower edge of the mesh ends and mesh sides of the trap, thus trapping any crab within the trap.

In an alternative embodiment, a plurality of pivotable trap doors are attached one each to the outer edges of the bottom mesh and one end of each of a pair of individual draw cords is tied to each trap door at an external corner thereof opposite the means of pivotable attachment. In this embodiment the pairs of draw cords are threaded through the vertical corner posts and pass upwardly through the posts and are joined at the top to the single draw cord.

In another alternative embodiment, the plurality of pivotable trap doors are attached one each to each of the outer edges of the bottom mesh and one end of each of individual draw cords is tied to each trap door at the side opposite the means of pivotable attachment and near the center thereof, and the draw cords pass upwardly over the mesh top and join together at a common point above the frame and attach to a single common draw cord which extends to the water surface.

DETAILED DESCRIPTION OF THE INVENTION WITH REFERENCE TO THE PREFERRED EMBODIMENTS

A crab trap is provided having an open configuration prior to trapping a crab and into which a crab can crawl to retrieve bait placed therein, the trap also having a closed configuration for trapping a crab therein. The trap has a generally rectangular frame assembly comprising a base frame having two hollow bottom side connecting tubes and two hollow bottom end connecting tubes connected a their corners by corner elbow connectors. A plurality of hollow vertical corner posts is inserted in the corner elbow connectors and is three dimensionally perpendicular to the rectangular frame. The vertical corner posts each have a longitudinal opening extending from the lower end of the vertical corner post to the approximate center point of the vertical corner post along the length of the vertical corner post. Alternatively, a somewhat shorter draw slot near the vertical center of each tubular corner post may be employed. The bottom side connecting tubes, bottom end connecting tubes and vertical corner posts all contain a plurality of openings to permit water to flow therethrough. A mesh covering covers the frame on the top, sides and ends and is attached to the frame at strategic locations by suitable retainers. The bottom mesh rests on the base frame. A plurality of draw cords, one end of each draw cord being tied to one side or corner of the bottom mesh is threaded through the openings in the vertical corner posts and exits at the upper ends of the vertical corner posts, the plurality of draw cords being joined together at a common point above the frame into a single draw cord which extends to the water surface.

Figure 1:
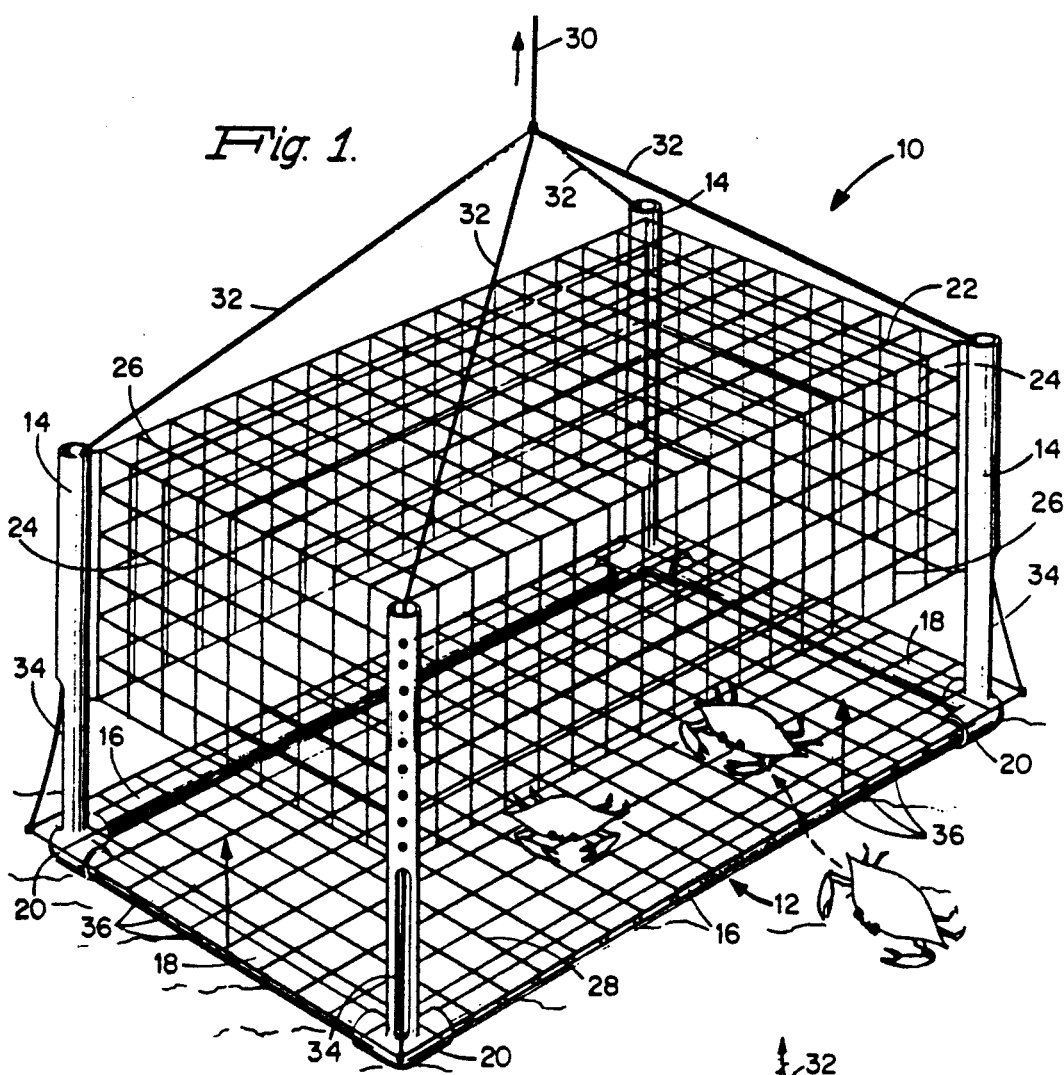
FIG. 1 is a perspective view of the crab trap of the invention in the open position.

In the drawings, FIG. 1 shows trap 10 with two crabs within the trap and a third about to enter. It also shows the two bottom side connecting tubes 16 parallel to one another and the two bottom end connecting tubes 18 parallel to one another and connected together by the side outlet elbows 20 at the four corners. Four vertical corner posts 14 are inserted in the side outlet elbows 20 as shown. The items 16, 18, 20, and 14 comprise the rigid frame 12 which is covered by the top mesh 22, the mesh bottom 28, two mesh ends 24, and two mesh sides 26. The mesh ends 24 and mesh sides 26 only cover the upper portion of the vertical cornerposts 14. The frame 12 contains a plurality of openings 36 which allow water to enter and exit the members and allow the frame to sink rapidly in the water. FIG. 1 also shows the threading of the individual draw cords 32 through the hollow vertical corner posts 14. One end of each draw cord 32 is tied to each corner of the bottom mesh 28 and the other end is tied to common draw cord 30. When the draw cord 30 is drawn up, the individual draw cords 32 slide within the vertical corner posts 14. Each vertical corner post 14 contains a longitudinal slotted opening 34 which allows the individual cords 32 to raise the mesh bottom 28 to the bottom of the mesh end 24 and the mesh sides 26. When this occurs, any crabs within the trap can not escape.

Figure 2:
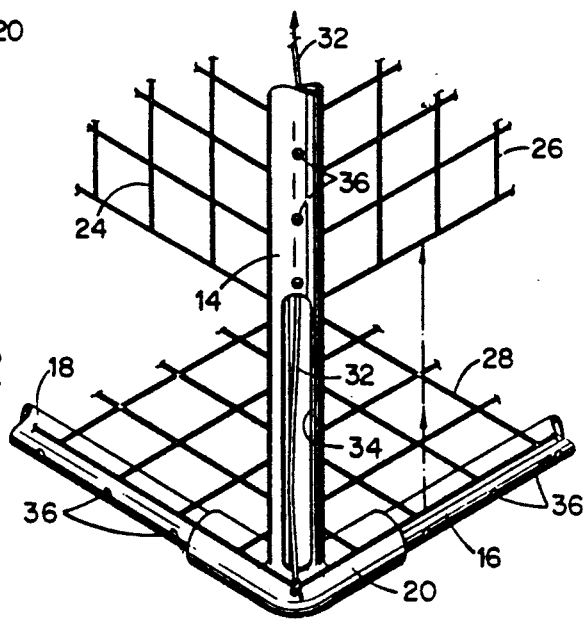
FIG. 2 is a perspective fragmentary view of the longitudinal slot-like opening in the vertical corner posts.

FIG. 2 shows in detail the longitudinal slot-like openings 34 contained in the vertical corner posts 14. These openings allow the individual cords 32 to raise the mesh bottom 28. Also, this figure shows the assembly of corner elbow 20 with vertical corner post 14, and connecting tube bottom side and connecting tube bottom end insert ed in it. Each vertical corner post 14 is inserted through the respective corner-most square of the mesh bottom 28. This keeps the mesh bottom 28 in alignment when raised. The plurality of openings 36 in the frame are also shown in this figure.

Figure 3:
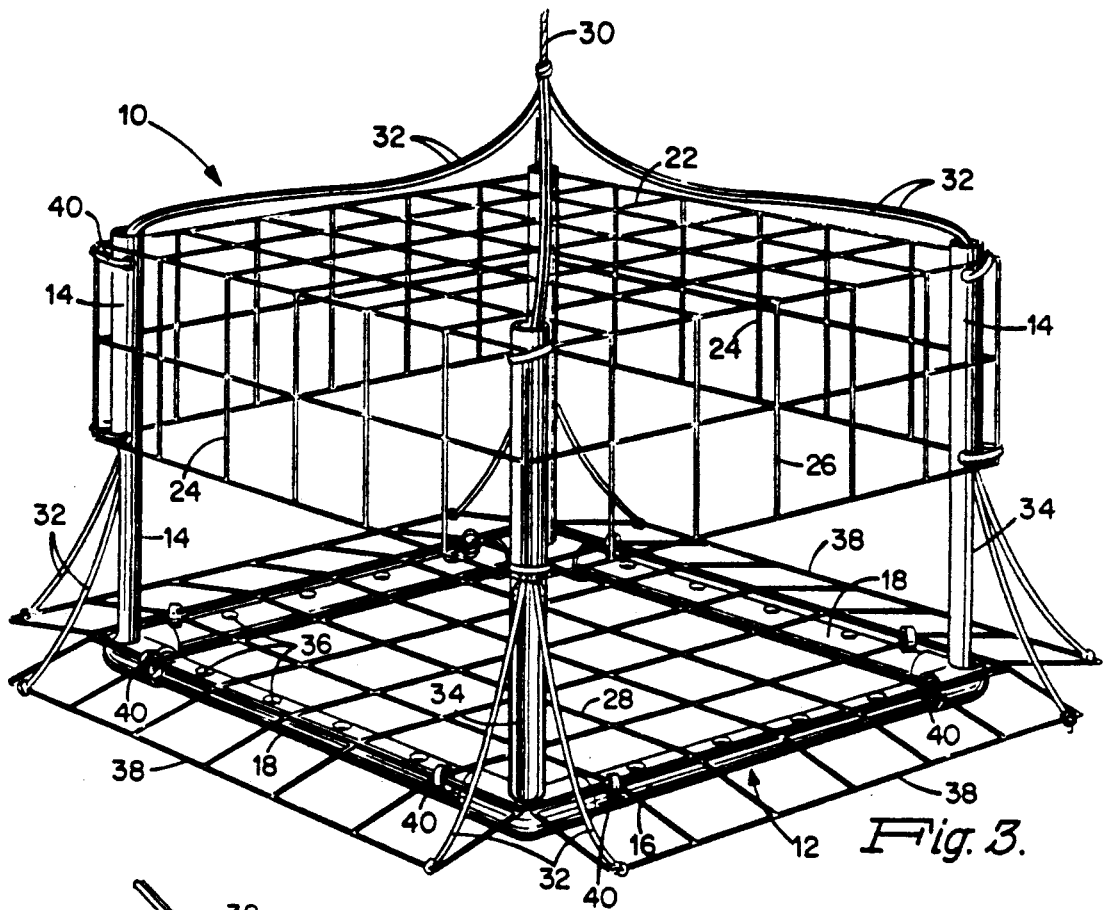
FIG. 3 is a perspective view of the crab trap having pivoting trap doors with the trap in the open position.

FIG. 3 is a perspective view of an open crab trap 10 having pivoting trap doors 38. In this embodiment of the crab trap four pivoting trap doors 38 are connected to each side of the mesh bottom 28 and one end of each individual cord is tied to each pivoting trap door on the side site to the side attached to the mesh bottom 28. When common draw cord 30 is pulled, the individual draw cords 32 slide through the vertical corner posts 14 and the pivotable trap doors fold upward and the mesh bottom 28 rises.

Figure 3A:
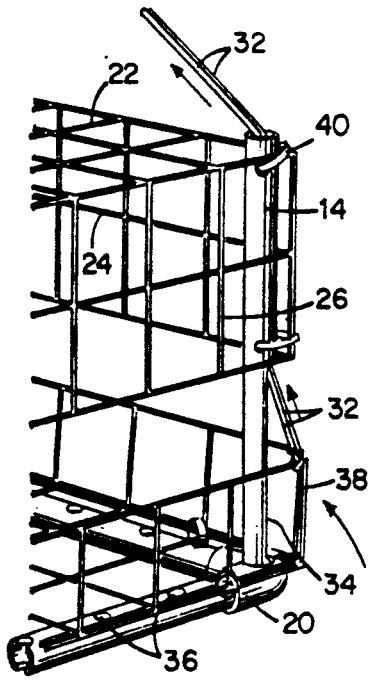
FIG. 3a is a fragmentary view of the crab trap with the pivotable trap doors in the up position and the mesh bottom in the lower position.
Figure 3B:
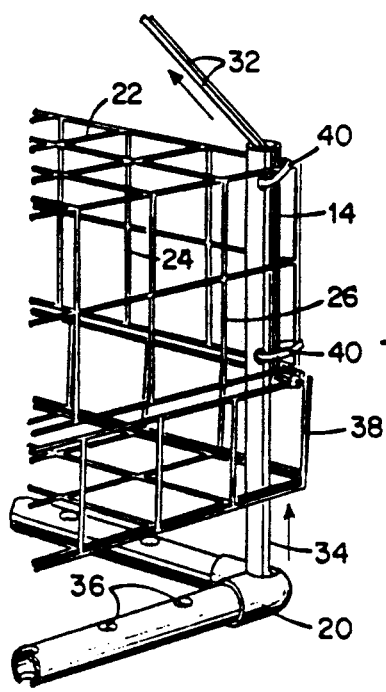
FIG. 3b is a fragmentary view of the crab trap with the pivotable trap doors in the up position and the mesh bottom in the upper, closed position.

FIGS. 3a and 3b show the alternative embodiment of the crap trap with the pivotable trap doors 38 in the intermediate and closed positions. One end of the draw cord 32 is tied to the outer edge of the pivotable trap door 38 and passes through longitudinal opening 34 and exits out of the top of the vertical corner post 14. In FIG. 3a the pivotable trap door 38 has been folded up by pulling the individual corner draw cord 32 but the mesh bottom has not been raised. In FIG. 3b the mesh bottom 28 has been raised and any crab within the trap can not escape.

Figure 4:
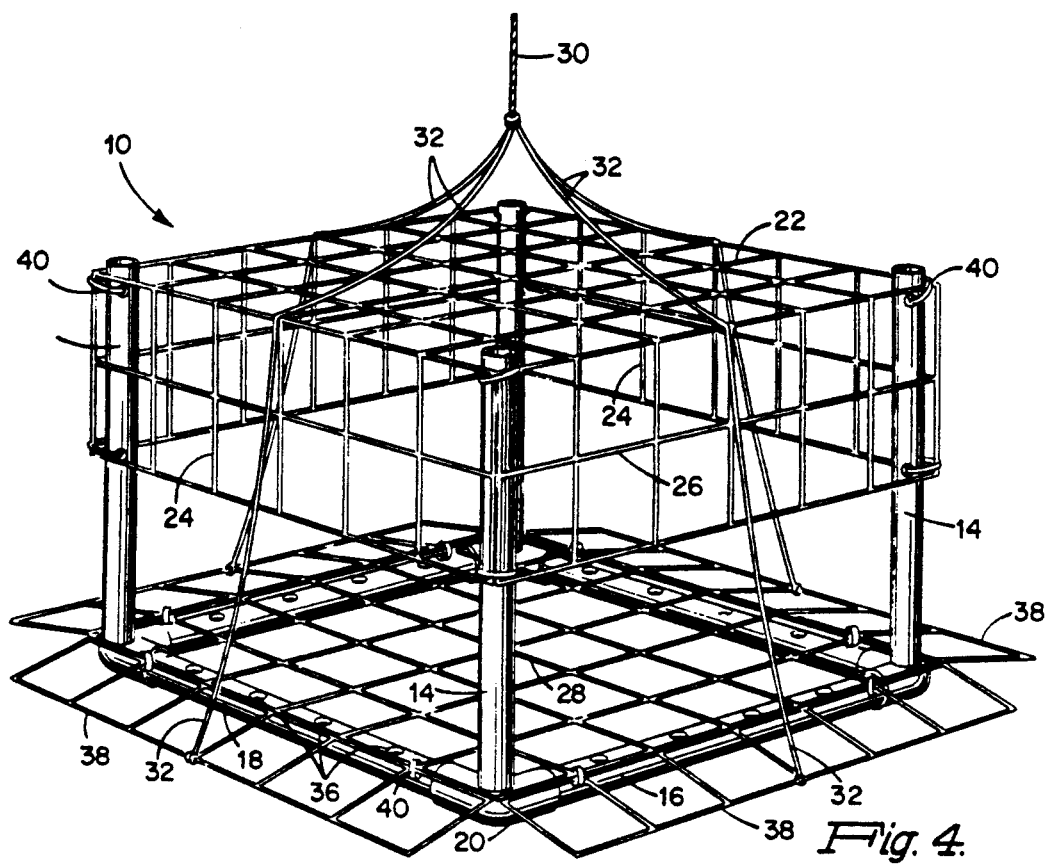
FIG. 4 is a perspective view of the crab trap with pivotable trap doors and an alternative method of cord threading.

FIG. 4 is a perspective view of an open crab trap 10 having pivoting trap doors 38 and having an alternative method of cord threading. In this embodiment of the crab trap, four pivoting trap doors 38 are connected to each side of the mesh bottom 28 and one end of each individual cord 32 is tied to each pivoting trap door on the side opposite to the side attached to the mesh bottom 28. The individual cords 32 are drawn over the mesh ends 24 and the mesh sides 26 and joined together with a knot with the single common draw cord 30 above the top mesh 22. When draw cord 30 is pulled, it draws the individual draw cords 32 which initially raises and closes the pivoting trap doors 38 and then raises the mesh bottom 28, thereby trapping any crabs within the trap.

Figure 4A:
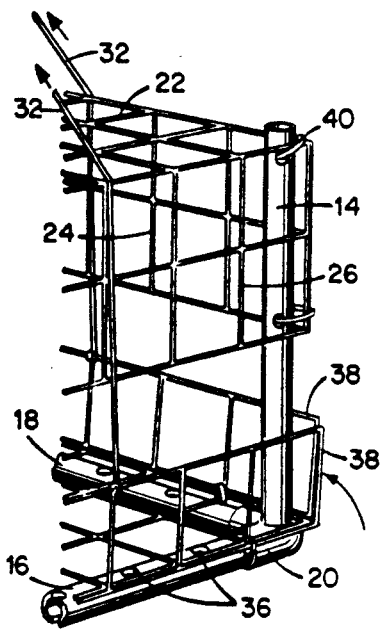
FIG. 4a is a fragmentary view of the crab trap with the pivotable trap doors in the up position and the mesh bottom in the lower position using the alternative method of cord threading.
Figure 4B:
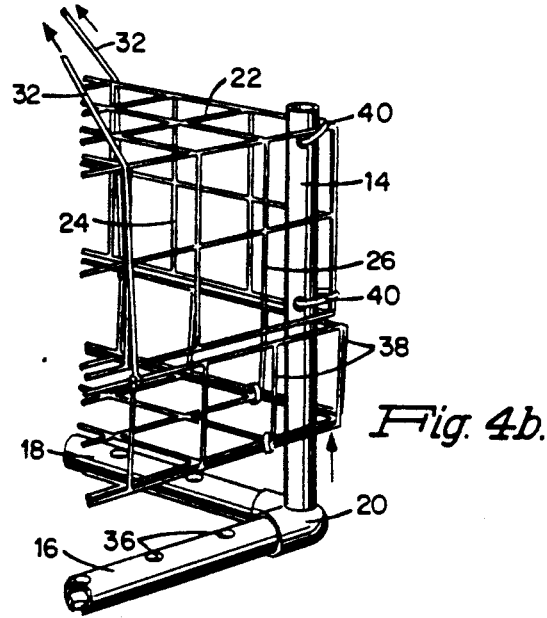
FIG. 4b is a fragmentary view of the crab trap with the pivotable trap door in the up position and the mesh bottom in the upper position using the alternative method of cord threading.

FIGS. 4a and 4b show the alternative embodiment of the crap trap using the alternative threading of the draw cords 32 with the pivotable trap doors 38 in the intermediate and closed positions. One end of each individual draw cord 32 is tied to the outer edge of the pivotable trap door 38 near its midpoint and is drawn over the mesh ends 24 or the mesh sides 26. In FIG. 4b the pivotable trap door 38 has been folded up by pulling the individual corner draw cord 32 but the mesh bottom has not been raised. In FIG. 4b the mesh bottom 28 has been raised and any crab inside the trap has been trapped. Retainers 40, which may simply be bag ties, are shown holding mesh to mesh and mesh to frame.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A crab trap having an open configuration prior to trapping a crab and into which a crab can crawl to retrieve bait placed therein, said trap also having a closed configuration for trapping a crab therein, said trap comprising:

a generally rectangular frame assembly comprising a base frame having two hollow bottom side connecting tubes and two hollow bottom end connecting tubes, said bottom side connecting tubes being parallel to one another and said bottom end connecting tubes being parallel to one another, said bottom side connecting tubes and bottom end connecting tubes being perpendicular to each other and said bottom side connecting tubes and said bottom end connecting tubes being joined by a plurality of corner elbow connectors; a plurality of hollow vertical corner posts being inserted in the corner elbow connectors and perpendicular to said bottom side connecting tubes and bottom end connecting tubes connected at the corner elbow connectors, said vertical corner posts each containing a longitudinal slotted opening extending downwardly from approximately the center point of the vertical corner post along the length of the vertical corner post; said bottom, side connecting tubes, bottom end connecting tubes and vertical corner posts contain a plurality of openings; said frame assembly having a mesh covering comprising a top mesh, two mesh ends, two mesh sides, and a bottom mesh, said top mesh covering the area formed by the plane between the top ends of said vertical corner posts, the said mesh ends and mesh sides covering the planes formed from the top ends of said vertical corner posts to the approximate mid-point of the hollow vertical corner posts, said top mesh, mesh ends, and mesh sides being connected to said frame at a plurality of, strategic locations by retainers, said bottom mesh resting on said base frame; said frame assembly including a plurality of draw cords, one end of each draw cord being tied to said bottom mesh and threaded through the opening in one of the said vertical corner posts and exiting at the upper end of said vertical corner post, said plurality of draw cords joined together at a common point above the frame assembly and attached thereat to a single draw cord extending to the water surface such that, when the single draw cord is pulled, the plurality of draw cords slide within said vertical corner posts and the bottom mesh rises upwardly to engage the lower edges of said mesh end and mesh sides thereby trapping any crab within the trap.

2. The device of claim 1 wherein a plurality of trap doors are provided, one each of said doors being pivotably attached to each outer edge of said bottom mesh, said plurality of draw cords comprising pairs of draw cords, one end of each pair of said draw cords being tied to an external corner of each said trap door opposite the means of pivotable attachment thereof, each pair of draw cords being threaded through one vertical corner post and passing upwardly through said post and being joined at the top to said single draw cord.

3. A crab trap having an open configuration prior to trapping a crab and into which a crab can crawl to retrieve bait placed therein, said trap also having a closed configuration for trapping a crab therein, said trap comprising:

a generally rectangular frame assembly comprising a base frame having two hollow bottom side connecting tubes and two hollow bottom end connecting tubes, said bottom side connecting tubes being parallel to one another and said bottom end connecting tubes being parallel to one another said bottom side connecting tubes and bottom end connecting tubes being perpendicular to each other said bottom side connecting tubes and said bottom end connecting tubes being joined by a plurality of corner elbow connectors; a plurality of hollow vertical corner posts being inserted in the corner elbow connectors and perpendicular to said bottom side connecting tubes and bottom end connecting tubes connected at the corner elbow connectors, said bottom side connecting tubes, bottom end connecting tubes and vertical corner posts containing a plurality of openings; said frame assembly having a mesh covering comprising a top mesh, two mesh ends, two mesh sides, and a bottom mesh, said top mesh covering the area formed by the plane between the top ends of said vertical corner posts, said mesh ends and mesh sides covering the planes formed from the top ends of said vertical corner posts to the approximate mid-point of the hollow vertical corner posts, said top mesh, mesh ends, and mesh sides being connected to said frame at a plurality of strategic locations by retainers, said bottom mesh resting on said base frame; said frame assembly including a plurality of pivotable trap doors attached one each to each outer edge of said bottom mesh, said frame assembly including a plurality of draw cords, one end of each of said draw cords being tied to one of said trap doors at approximately the mid-point of the side opposite the means of pivotable attachment thereof, said draw cords passing over said mesh top and joining together at a common point above said frame and being affixed thereat to a single draw cord extending to the water surface.

* * * * *